United States Patent [19]

Pino, deceased et al.

[11] Patent Number: 5,122,579
[45] Date of Patent: Jun. 16, 1992

[54] REDUCING SYNDIOTACTICITY OF COLSTYRENE COPOLYMER WITH BASE AND ELEVATED TEMPERATURE

[75] Inventors: Piero Pino, deceased, late of Zurich, Switzerland, by Giulia P. Brunelleschi, legal representative; Giorgia Petrucci, Florence, Italy; Marco Barsacchi, Zurich, Switzerland

[73] Assignee: Shell Oil Company, Houston, Tex.

[21] Appl. No.: 553,468

[22] Filed: Jul. 17, 1990

[30] Foreign Application Priority Data

Jul. 26, 1989 [NL] Netherlands .................. 8901926

[51] Int. Cl.$^5$ ............................................. C08G 67/02
[52] U.S. Cl. ................................ 525/539; 528/392; 528/488; 528/492; 528/495
[58] Field of Search ............... 525/539; 528/488, 492, 528/495, 392

[56] References Cited

U.S. PATENT DOCUMENTS

| | | | |
|---|---|---|---|
| 4,788,279 | 11/1988 | Drent | 528/392 |
| 4,965,341 | 10/1990 | Van Doorn et al. | 528/392 |
| 4,994,513 | 2/1991 | Syrier et al. | 525/539 |
| 5,019,645 | 5/1991 | Wong et al. | 525/539 |

FOREIGN PATENT DOCUMENTS

| | | |
|---|---|---|
| 222254 | 5/1987 | European Pat. Off. . |
| 229408 | 7/1987 | European Pat. Off. . |
| 277695 | 8/1988 | European Pat. Off. . |

*Primary Examiner*—Harold D. Anderson

[57] ABSTRACT

Certain linear alternating polymers of carbon monoxide and styrene are characterized by a high degree of syndiotactic character. This degree of syndiotactic character is reduced together with an attendant increase in atactic character by contacting the syndiotactic polymer with organ base at an elevated temperature.

15 Claims, No Drawings

REDUCING SYNDIOTACTICITY OF COLSTYRENE COPOLYMER WITH BASE AND ELEVATED TEMPERATURE

FIELD OF THE INVENTION

This invention relates to the reduction in syndiotactic character of linear alternating copolymers of carbon monoxide and styrene. More particularly, the present invention relates to the decrease in syndiotactic character and attendant increase in atactic character of such linear alternating copolymers.

BACKGROUND OF THE INVENTION

The linear alternating polymers of carbon monoxide and styrene are known in the art from the disclosures of U.S. Pat. No. 4,788,279, being produced in the presence of a catalyst composition formed from a palladium compound, the anion of a non-hydrohalogenic acid having a pKa less than 2, a bidentate ligand of nitrogen and an organic oxidant. In terms of the fine structure of such linear alternating polymers, they are termed regioregular and syndiotactic, having an average syndiotacticity of from about 60% to about 85% depending in part upon the particular catalyst composition and reaction conditions selected for the polymerization.

The term "regioregular" as applied to the carbon monoxide/styrene copolymers refers to the manner in which the moieties derived from styrene are bound chemically to the moieties derived from carbon monoxide. If the styrene moieties are connected to the carbon monoxide moieties in predominantly a head-to-tail fashion, the polymer is termed regioregular. A polymer with less than a predominance of head-to-tail bonding is termed regio-irregular or non-regioregular. The term "syndiotactic" refers to the configuration of the asymmetric carbon atoms in the linear alternating polymer. When the configuration of the asymmetric carbon atoms is the same, e.g.,

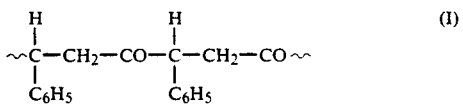

wherein the wavy lines indicate the continuing polymer chain, the polymer is termed isotactic. However, when the configuration of adjacent asymmetric carbon atoms is opposite, e.g.,

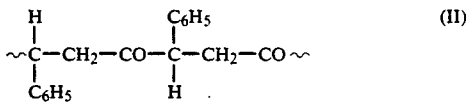

the polymer is termed syndiotactic. A polymer in which there is no predominant or regular arrangement of adjacent asymmetric carbon atoms is termed atactic or stereo-irregular.

In practice, however, any given polymer will not be completely structured in either of the isotactic or syndiotactic forms. If more than 50% of the adjacent asymmetric carbon atoms are oppositely configured relative to the adjacent asymmetric carbon atom, the polymer is considered to be syndiotactic. The average percentage of such carbon atoms of syndiotactic configuration is termed the average syndiotacticity. The production of atactic linear alternating polymers of carbon monoxide and styrene is disclosed in copending U.S. patent application Ser. No. 352,235, filed May 15, 1989, now U.S. Pat. No. 4,965,341.

For some applications it is desirable to have a linear alternating copolymer of carbon monoxide and styrene which has a high degree of syndiotactic character, i.e., the polymer would be highly syndiotactic. For other applications, an atactic polymer is preferred. It would be of advantage to provide a method for reducing the syndiotactic character of a linear alternating carbon monoxide/styrene copolymer and at the same time increase the atactic character of the resulting polymer.

SUMMARY OF THE INVENTION

The present invention provides a method for the alteration of the asymmetric carbon atom structure of certain linear alternating copolymers of carbon monoxide and styrene. More particularly, the present invention provides a method for the reduction of syndiotactic character of a linear alternating copolymer of carbon monoxide and styrene with an attendant increase in atactic character of the linear alternating copolymer by contacting the copolymer with an organic base.

DESCRIPTION OF THE INVENTION

The process of the invention comprises the heating of a linear alternating polymer of carbon monoxide and styrene having a relatively high degree of syndiotactic character, for example, at least above 50%, preferably above about 65% and more preferably above about 85% syndiotacticity, with an organic base. The process serves to convert the syndiotactic relationship of asymmetric carbon atoms in the polymer chain to an atactic relationship. The overall result of the process of the invention is to decrease the average syndiotacticity of the linear alternating polymer and increase the atacticity. The extent to which the syndiotactic character is lost and the atactic character is increased will depend in part on the reaction conditions employed and the particular organic base.

The syndiotactic copolymer to which the process of the invention is applied is a linear alternating copolymer of carbon monoxide and styrene in which (a) the moieties derived from styrene are attached to the moieties derived from carbon monoxide in predominantly a head-to-tail manner and (b) the configuration of adjacent asymmetric carbon atoms is predominantly opposite. Such polymers are represented by the above repeating formula II. The polymers are produced according to the general teaching of U.S. Pat. No. 4,788,279 by contacting carbon monoxide and styrene under polymerization conditions in the presence of a liquid reaction diluent and a catalyst composition formed from a palladium compound, the anion of a nonhydrohalogenic acid having a pKa less than 2 and a bidentate ligand of nitrogen. The scope of the polymerization is extensive but, without wishing to be limited, a preferred catalyst composition is formed from palladium acetate, the anion of trifluoroacetic acid or p-toluenesulfonic acid and a bidentate ligand of nitrogen such as 2,2'-bipyridine or 1,10-phenanthroline. It is generally useful to include an organic oxidant such as 1,4-benzoquinone in the mixture from which the catalyst composition is formed. A typical catalyst composition contains from about 1 mole to about 100 moles of anion per mole of palladium, from about 1 mole to about 50 moles of ligand per mole of palladium and from about 10 moles to about 5000 moles of oxidant per mole of palladium.

The carbon monoxide and styrene are contacted in a liquid reaction diluent such as methanol or ethanol. Methanol is preferred. Typical polymerization conditions include a temperature from about 30° C. to about 150° C. and a pressure from about 20 bar to about 100 bar. The molar ratio of styrene to carbon monoxide to be employed is from about 5:1 to about 2:1 and sufficient catalyst composition is used to provide from about $1 \times 10^{-6}$ mole to about $1 \times 10^{-4}$ mole of palladium per mole of styrene.

Reactant contacting is faciliated by some means of agitation such as shaking or stirring. Subsequent to polymerization the reaction is terminated as by cooling the product mixture and releasing the pressure. The polymer product is typically obtained as a material substantially insoluble in the reaction diluent and is recovered by conventional methods such as filtration or decantation. The polymer product is substantially regioregular and syndiotactic and is employed in the process of the invention without the need for purification.

The process of the invention comprises contacting the syndiotactic linear alternating copolymer of carbon monoxide and styrene with a strong organic base. A variety of organic bases are usefully employed in the process but preferred strong organic bases are tertiary amines, N-alkylamides or alkali metal phenolates. Suitable tertiary amines include trimethylamine, dimethylethylamine, diethyllaurylamine, N,N-dimethylaniline and dimethyltoluamine. Useful amide materials include N,N-dimethylformamide, N,N-dimethylacetamide and N-methylpyrrolidine. Alkali metal phenolates are preferably sodium or potassium phenolates, especially sodium phenolates, such as sodium phenolate, potassium m-cresolate and sodium o-chlorophenolate. The class of N,N-dimethylaniline, N,N-dimethylformamide and sodium o-chlorophenolate is a preferred class of strong organic bases.

The precise manner of contacting the syndiotactic polymer and the strong organic base and the molar ratio of polymer to base are not material and will depend in part upon the physical form and the relative solubilities of the materials being contacted. If the strong organic base is a liquid at the temperature of contacting, the process of reducing syndiotacticity is often conducted employing a suspension or solution of the linear alternating polymer in the organic base. For example, the process of the invention is efficiently conducted using a suspension of the polymer in N,N-dimethylaniline or N,N-dimethylformamide. If the basic material is a solid at the temperature of contacting, e.g., an alkali metal phenolate, a reaction solvent or diluent is employed as a portion of the reaction mixture. A particularly useful solvent or diluent is the phenol corresponding to the alkali metal phenolate. Particularly good results are obtained by contacting the syndiotactic polymer with a mixture of sodium o-chlorophenolate and o-chlorophenol. In the modifications of the process of the invention wherein a solution of the basic material and polymer are reacted, the polymer product of reduced syndiotactic character is recovered from solution most easily by precipitation with a non-solvent, e.g., methanol, followed by filtration or decantation. In the modification where a suspension of the polymer in a liquid basis material is employed it may also be useful to add a diluent such as methanol to improve the fluidity of the product mixture and facilitate recovery of the product polymer.

The process of the invention comprises contacting the syndiotactic polymer and the organic basic material at an elevated temperature for a time sufficient to cause the desired degree of reduction of syndiotactic character. Suitable reaction temperatures are from about 40° C. to about 200° C. although higher temperatures or somewhat lower temperatures are also useful. The time of the reaction will depend in part upon the temperature of the contacting, the strength of the basic material and the degree of reduction of syndiotactic character it is desired to achieve. To achieve a relatively small reduction in syndiotactic character a relatively short reaction time on the order of several hours, for example, is sufficient. Larger reductions in syndiotactic character may require longer reaction times or alternatively are achieved through use of higher reaction temperatures.

The polymer products of the invention of reduced syndiotactic character are thermoplastics useful in conventional applications of such materials. The polymers are characterized by a greater degree of atactic character and are wholly or in part amorphous. The products typically have relatively low glass transition temperatures and are frequently more easily processed than the syndiotactic polymers from which they are produced. The polymers of a relatively high degree of atactic character are particularly useful in adhesive formulations.

The invention is further illustrated by the following Illustrative Embodiments which should not be regarded as limitations.

ILLUSTRATIVE EMBODIMENT I

A linear alternating copolymer of carbon monoxide and styrene was prepared which had an average syndiotacticity of more than 90%, a melting point of 280° C., an intrinsic viscosity as measured in o-chlorophenol of 0.128 dl/g and an average molecular weight of 6700 as measured with vapor pressure osmometry in o-chlorophenol at 80° C.

To a solution of 4.017 g of this polymer in 40 ml of o-chlorophenol, 3.6 ml of a suspension of sodium o-chlorophenolate in o-chlorophenol was added having a concentration of 4.5 g of sodium salt per 100 ml of o-chlorophenol. The mixture was heated at 60° C. for 24 hours. The resulting polymer was precipitated with methanol, recovered by filtration and extracted for 2 hours with boiling methanol. The resulting residue was dried at 60° C. at a pressure of 0.125 bar. The dried product was examined by $^{13}$C-NMR and was found to have an entirely atactic structure. Analysis by X-ray indicated a completely amorphous structure.

The atactic polymer had an average molecular weight of 3200, determined as above, an intrinsic viscosity of 0.141 dl/g, determined as above, and a glass transition temperature of 100° C.–110° C.

This experiment was substantially repeated except that the heating at 60° C. with sodium o-chlorophenolate was terminated earlier. The polymer which resulted had a melting point of 285° C., a glass transition temperature of 110° C. and was shown by $^{13}$C-NMR analysis to have an average syndiotacticity of about 65%.

ILLUSTRATIVE EMBODIMENT II

A linear alternating copolymer of carbon monoxide and styrene was prepared with an average syndiotacticity of more than 90%, a melting point of 295° C., an intrinsic viscosity of 0.202 dl/g as measured in o-chlorophenol at 60° C. and an average molecular weight of 14,000 as determined by vapor pressure osmometry in o-chlorophenol at 80° C.

To a solution of 4.01 g of this polymer in 20 ml of o-chlorophenol was added 20 ml of a 0.083M solution of sodium o-chlorophenolate in o-chlorophenol. The mixture was heated at 110° C. for 24 hours. The resulting polymer was precipitated with methanol, recovered by filtration, washed with water and extracted for 2 hours with boiling n-pentane. The residue from the extraction was dried at 60° C. and a pressure of 0.125 bar.

The resulting polymer product had a glass transition temperature of about 100° C., and intrinsic viscosity determined as above of 0.250 dl/g and an average molecular weight, determined as above, of 17,100. Analysis by X-ray indicated the product was completely amorphous and $^{13}$C-NMR analysis indicated the polymer was of an entirely atactic structure.

ILLUSTRATIVE EMBODIMENT III

A suspension of 4.575 g of the starting polymer of Illustrative Embodiment II in 50 ml of N,N-dimethylformamide was refluxed in a nitrogen atmosphere for 300 hours at a temperature of 152° C.–154° C. The resulting polymer was precipitated with methanol, recovered by filtration and extracted for 2 hours with boiling n-pentane. The residue of the extraction was dried at 60° C. and a pressure of 0.125 bar. The polymer product was shown by $^{13}$C-NMR analysis to have an entirely atactic structure.

ILLUSTRATIVE EMBODIMENT IV

A suspension of 3.0 g of the original polymer of Illustrative Embodiment II in 30 ml of N,N-dimethylaniline was heated in a nitrogen atmosphere at 180° C. for 168 hours. The resulting polymer was precipitated with methanol, recovered by filtration and extracted for 2 hours with boiling n-pentane. The residue of the extraction was dried at 60° C. and a pressure of 0.125 bar. The polymer product thereby obtained had a glass transition temperature of about 110° C. and a melting point of 275° C. which indicated a partial conversion to the atactic form.

What is claimed is:

1. A process for the reduction of syndiotactic character of a predominantly syndiotactic linear alternating polymer of carbon monoxide and styrene by contacting the syndiotactic polymer with an organic base at an elevated temperature.

2. The process of claim 1 wherein the syndiotacticity of the linear alternating polymer is above about 65% prior to contacting the syndiotactic polymer with an organic base at an elevated temperature.

3. The process of claim 2 wherein the organic base is a tertiary amine, an N-alkylamide or an alkali metal phenolate.

4. The process of claim 2 wherein the elevated temperature is from about 40° C. to about 200° C.

5. The process of claim 4 wherein the contacting comprises heating a suspension of linear alternating polymer in a tertiary amine.

6. The process of claim 5 wherein the tertiary amine is N,N-dimethylaniline.

7. The process of claim 4 wherein the contacting comprises heating a suspension of linear alternating polymer in an N-alkylamide.

8. The process of claim 7 wherein the N-alkylamide is N,N-dimethylformamide.

9. The process of claim 4 wherein the contacting comprises heating a solution of alkali metal o-chlorophenolate and linear alternating polymer.

10. The process of claim 9 wherein the solution of alkali metal O-chlorophenolate and linear alternating polymer is a solution in o-chlorophenol.

11. The process of claim 10 wherein the alkali metal is sodium.

12. A process for the reduction of syndiotactic character of a linear alternating polymer of carbon monoxide and styrene, by contacting the polymer with a strong organic base at an elevated temperature, wherein the polymer has a syndiotacticity above about 65% prior to contact with the organic base at an elevated temperature.

13. The process of claim 12 wherein the strong organic base is N,N-dimethylaniline, N,N-dimethylformamide, or sodium o-chlorophenolate.

14. The process of claim 13 wherein the elevated temperature is from about 40° C. to about 200° C.

15. The process of claim 12 wherein the polymer has a syndiotacticity above about 85%, prior to contact with the organic base.

* * * * *

UNITED STATES PATENT AND TRADEMARK OFFICE
CERTIFICATE OF CORRECTION

PATENT NO. : 5,122,579
DATED : June 16, 1992
INVENTOR(S) : Piero Pino; Giorgio Petrucci; and Marco Barsacchi It is certified that error appears in the above-identified patent and that said Letters Patent is hereby corrected as shown below:

On title page, item [54] and col. 1,
The title should read as follows:

REDUCING SYNDIOTACTICITY OF CO/STYRENE COPOLYMER WITH BASE AND ELEVATED TEMPERATURE

Item [54] Inventors should read as follows:

Inventors: Piero Pino, deceased, late of Zurich, Switzerland, by Giulia P. Brunelleschi, legal representative; Giorgio Petrucci, Florence, Italy; Marco Barsacchi, Zurich, Switzerland Signed and Sealed this Seventh Day of December, 1993

Attest:

BRUCE LEHMAN

*Attesting Officer*  *Commissioner of Patents and Trademarks*